Patented May 4, 1926.

1,583,002

UNITED STATES PATENT OFFICE.

GUSTAVE P. METZ, OF BROOKLYN, NEW YORK, ASSIGNOR TO H. A. METZ LABORATORIES, INC., OF NEW YORK, N. Y., A CORPORATION OF NEW YORK.

DETOXIFYING COMPOUND AND PROCESS OF MAKING IT.

No Drawing.  Application filed November 6, 1925. Serial No. 67,435.

*To all whom it may concern:*

Be it known that I, GUSTAVE P. METZ, a citizen of the United States, residing at Brooklyn, in the county of Kings and State of New York, have invented certain new and useful Improvements in a Detoxifying Compound and Processes of Making It, of which the following is a specification.

Carbamid (urea) is known to form double salts or molecular compounds with various inorganic salts, notably with calcium nitrate, calcium bromide and calcium chloride. The salt or compound of calcium chloride and carbamid containing one molecule of calcium chloride and four molecules of carbamid is a valuable aid in calcium therapy.

Sodium thiosulfate is extensively used in the treatment of arsenical dermatitis. It is reported to give good results in mercury and lead poisoning and recent medical literature shows it to possess high clinical value in metallic toxemias. The mechanism of the action of sodium thiosulfate is not accurately known, but it probably consists in dislodging the toxic material from the tissues in which it is deposited and converting it into less toxic compounds by chemical action. Once this has taken place, it is important to promote diuresis in order to eliminate the toxic metal as rapidly as possible.

I have now found that this can be accomplished by combining the carbamid with sodium thiosulfate to form compounds in which the detoxifying effect of the sodium thiosulfate is combined with the powerful eliminating action of the carbamid.

The new compounds have a very low toxicity and are capable of forming sterile stable solutions suitable for intravenous injection. They do not irritate the tissues or cause pain on injection.

One, two, three or four molecular proportions of carbamid may be combined with one molecular proportion of sodium thiosulfate. On account of its physical and therapeutic properties the combination of one molecule of sodium thiosulfate with four molecules of carbamid is most suitable for clinical application.

*Example I.*—124 gms. of crystallized sodium thiosulfate are mixed intimately with 120 gms. of carbamid (molecular ratio 1:4). The mixture is heated in a shallow dish on a steam bath or sand bath until a smooth melt is obtained. The temperature of the melt should not be allowed to run over 120° C. The heating is continued until about 3 mols. of the original 5 mols. of water of crystallization of the sodium thiosulfate have evaporated, and the net weight of the mixture has been reduced to about 220 gms. After cooling, the crystalline cake is finely powdered, dried in air, and sifted. The product is a white crystalline powder, stable when exposed to the air. It is readily and completely soluble in water. It contains about 37% active $Na_2S_2O_3$ as determined titrimetrically and about 7% $H_2O$ as water of crystallization.

This stable hydrate containing 7% $H_2O$ is also obtainable by drying the melt in air after cooling and powdering, or by drying in vacuum.

*Example II.*—Following exactly the same procedure as in Example I, but using 124 gms. crystallized sodium thiosulfate and 90 gms. carbamid (molecular proportion 1–3) a white crystalline powder is obtained containing 43% active $Na_2S_2O_3$ and 7–8% water of crystallization.

*Example III.*—As an alternative method of preparation, the melt as obtained in Examples I or II may be poured into 3 to 4 volumes of 95% alcohol with stirring and cooling. The compound of carbamid and sodium thiosulfate separates out in the form of white crystalline flakes which are filtered off by suction and dried in air or vacuum. The product obtained in this way contains about 48% $Na_2S_2O_3$ and 3 to 4% $H_2O$.

In a similar manner, compounds containing the carbamid and the sodium thiosulfate in the molecular ratios of 2:1 and 1:1 may be prepared and it is of course obvious that molecular ratios intermediate the ratios represented by the whole numbers 1, 2, 3 and 4 may be employed.

I claim:

1. As a new product a compound of carbamid and sodium thiosulfate.

2. As a new product a compound of carbamid and sodium thiosulfate, the molecular ratio of the carbamid to the sodium thiosulfate in said compound lying within the range from 4:1 to 1:1.

3. As a new product a compound of carbamid and sodium theiosulfate the molecular ratio of the carbamid to the sodium thiosulfate in said compound being 4:1.

GUSTAVE P. METZ.